United States Patent
Sugii (10) Patent No.: US 12,511,081 B2
(45) Date of Patent: Dec. 30, 2025

(54) IMAGE PROCESSING SYSTEM, AND NON-TRANSITORY COMPUTER READABLE MEDIUM STORING COMPUTER PROGRAM FOR PERFORMING PROCESS WITH ALTERNATIVE APPARATUS

(71) Applicant: FUJIFILM Business Innovation Corp., Tokyo (JP)

(72) Inventor: Masato Sugii, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 428 days.

(21) Appl. No.: 17/953,295

(22) Filed: Sep. 26, 2022

(65) Prior Publication Data

US 2023/0305759 A1   Sep. 28, 2023

(30) Foreign Application Priority Data

Mar. 24, 2022 (JP) ................. 2022-048830

(51) Int. Cl.
*G06F 11/14* (2006.01)
*G06F 3/12* (2006.01)
(52) U.S. Cl.
CPC .......... *G06F 3/1203* (2013.01); *G06F 3/1237* (2013.01); *G06F 3/1286* (2013.01)
(58) Field of Classification Search
CPC ............... G06F 3/1203; G06F 11/1402; G06F 11/1448
USPC ........................................... 358/1.15; 399/19
See application file for complete search history.

(56) References Cited

U.S. PATENT DOCUMENTS

| | | | |
|---|---|---|---|
| 9,026,532 B2 | 5/2015 | Yamanishi et al. | |
| 10,015,356 B2 | 7/2018 | Hori | |
| 2007/0148948 A1* | 6/2007 | Tanaka | G06F 21/608 438/602 |
| 2010/0103450 A1 | 4/2010 | Yanazume | |
| 2011/0238981 A1* | 9/2011 | Nanaumi | G06F 21/72 713/155 |
| 2017/0171413 A1 | 6/2017 | Kim et al. | |

FOREIGN PATENT DOCUMENTS

| | | | |
|---|---|---|---|
| JP | 2013012070 | | 1/2013 |
| JP | 6264800 | | 1/2018 |
| JP | 2018063579 A | * | 4/2018 |
| JP | 2019031084 A | * | 2/2019 |

OTHER PUBLICATIONS

"Search Report of Europe Counterpart Application", issued on Jul. 24, 2023, pp. 1-12.

* cited by examiner

*Primary Examiner* — Jamares Q Washington
(74) *Attorney, Agent, or Firm* — JCIPRNET (57) ABSTRACT

An image forming apparatus includes a processor configured to transmit data obtained by optically scanning a target object to a service for executing a predetermined process on the data, encrypt processing information for acquiring a result of the predetermined process of the service and executing a process for the result of the predetermined process, and transmit the encrypted processing information to another image forming apparatus.

8 Claims, 6 Drawing Sheets

IMAGE PROCESSING SYSTEM, AND NON-TRANSITORY COMPUTER READABLE MEDIUM STORING COMPUTER PROGRAM FOR PERFORMING PROCESS WITH ALTERNATIVE APPARATUS

CROSS-REFERENCE TO RELATED APPLICATIONS

This application is based on and claims priority under 35 USC 119 from Japanese Patent Application No. 2022-048830 filed Mar. 24, 2022.

BACKGROUND

(i) Technical Field

The present invention relates to an image forming apparatus, an image processing system, and a non-transitory computer readable medium storing a computer program.

(ii) Related Art

JP6264800B discloses an information processing system including a plurality of information processing apparatuses that execute a plurality of processes defined by workflow information. The workflow information is information in which an order of the plurality of processes and an information processing apparatus as an execution entity of each of the plurality of processes are defined. One information processing apparatus selected among the plurality of information processing apparatuses can be defined as the execution entity. Among the plurality of information processing apparatuses, the information processing apparatus defined as the execution entity executes each of the plurality of processes defined in the workflow information in the defined order, and one information processing apparatus selected in accordance with a predetermined determination condition executes a process of which an execution entity is defined as the one information processing apparatus selected among the plurality of information processing apparatuses in the workflow information.

SUMMARY

There is a system in which a multifunction peripheral having a function of transmitting a scanned document to a designated storage destination requests a part of processes (OCR and the like) requiring time to a cloud service and the multifunction peripheral of a requester receives a document of a processing result and transmits the document to the designated storage destination.

There is a possibility that the multifunction peripheral of the requester falls into a situation in which the processing result cannot be received for a reason such as a malfunction of an HDD in the middle of executing the process on a cloud service side. Considering this possibility, in a case of acquiring the processing result and providing information for performing the process after the acquisition to an alternative apparatus, the processing result may be leaked in a case where the information is intercepted by another apparatus not having permission.

Aspects of non-limiting embodiments of the present disclosure relate to provide an image forming apparatus, an image processing system, a non-transitory computer readable medium storing and a computer program that can receive a processing result of a service while preventing a leak of the processing result even in a case where the processing result cannot be received.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a processor configured to transmit data obtained by optically scanning a target object to a service for executing a predetermined process on the data, encrypt processing information for acquiring a result of the predetermined process of the service and executing a process for the result of the predetermined process, and transmit the encrypted processing information to another image forming apparatus.

BRIEF DESCRIPTION OF THE DRAWINGS

Exemplary embodiment(s) of the present invention will be described in detail based on the following figures, wherein.

DETAILED DESCRIPTION

Hereinafter, an example of an exemplary embodiment of the present invention will be described with reference to the drawings. In each drawing, identical or equivalent constituents and parts are designated by identical reference signs. In addition, dimensional ratios in the drawings are exaggerated for convenience of description and may be different from actual ratios.

Figure 1:
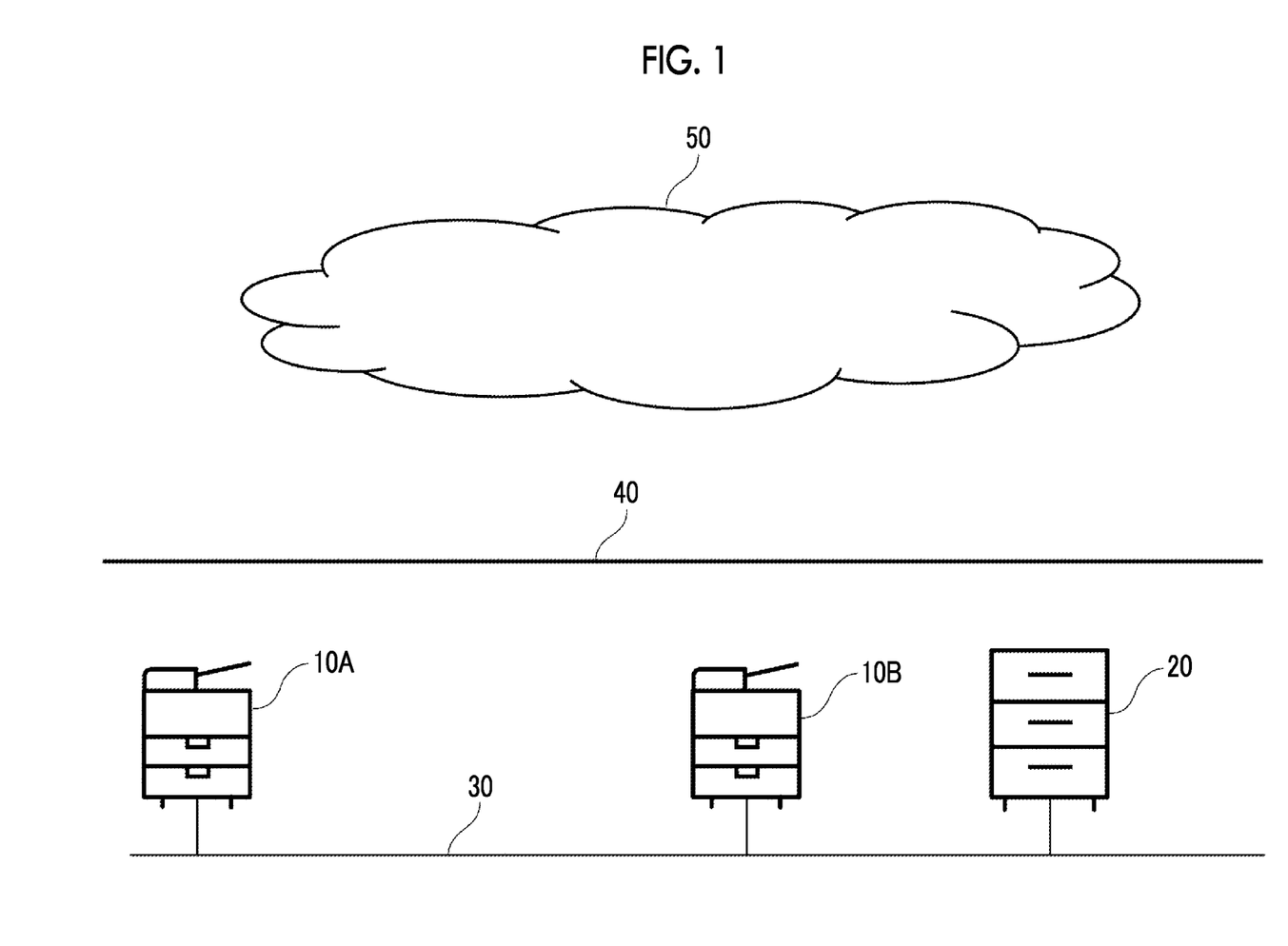
FIG. 1 is a diagram illustrating a schematic configuration of an image processing system according to a present exemplary embodiment.

FIG. 1 is a diagram illustrating a schematic configuration of an image processing system according to the present exemplary embodiment. The image processing system illustrated in FIG. 1 includes multifunction peripherals 10A and 10B that are an example of an image forming apparatus according to the exemplary embodiment of the present invention, a file server 20, and a cloud service 50. Each of the multifunction peripherals 10A and 10B and the file server 20 is connected to a local area network (LAN) 30 and is present in an identical network segment. The multifunction peripherals 10A and 10B and the file server 20 are protected from an outside network such as the Internet by a firewall 40.

The multifunction peripherals 10A and 10B are apparatuses having any plurality of functions among a plurality of functions such as a copying function, a printing function, a scanner function, a facsimile function, and an optical character recognition (OCR) function. For example, in a case where a print job is received from a personal computer or the like, not illustrated, the multifunction peripherals 10A and 10B execute a printing process based on the print job. In addition, for example, the multifunction peripherals 10A and 10B have a function of scanning a document and transmitting scanned data to the personal computer, not illustrated, or the file server 20. In the following description, the multifunction peripherals 10A and 10B will be simply described as a multifunction peripheral 10 unless otherwise necessary to distinguish.

The cloud service 50 executes a process based on a request of the multifunction peripheral 10 in cooperation with the multifunction peripheral 10. The cloud service 50 is implemented by a server present on a cloud network. In the present exemplary embodiment, the cloud service 50 generates text data from optically scanned scan data by executing the OCR function of recognizing the scan data.

In a case where the number of documents to be scanned by the multifunction peripheral 10 is small, a processing time required for character recognition of the scan data by the OCR function of the multifunction peripheral 10 is not long. However, in a case where the multifunction peripheral 10 has scanned a large number of documents, the processing time required for character recognition of the scan data by the OCR function of the multifunction peripheral 10 may be long. Therefore, the multifunction peripheral 10 transmits the scan data to the cloud service 50 and requests the cloud service 50 to process the scan data.

The firewall 40 is present between the multifunction peripheral 10 and the file server 20, and the cloud service 50. Thus, the cloud service 50 cannot transmit the generated text data to the file server 20 as a destination. Accordingly, in order to store the text data in the file server 20, the multifunction peripheral 10 downloads the text data generated by the cloud service 50 from the cloud service 50. The multifunction peripheral 10 transmits the downloaded text data to the file server 20.

In a case where the scan data is transmitted to the cloud service 50, the multifunction peripheral 10 performs polling to the cloud service 50 as to whether or not the generation of the text data is completed. In a case where the generation of the text data is completed, the cloud service 50 responds to the multifunction peripheral 10 to notify that the generation of the text data is completed with respect to the polling from the multifunction peripheral 10.

Here, a case where the text data cannot be downloaded from the cloud service 50 for a reason such as a malfunction or power-down of the multifunction peripheral 10 after transmitting the scan data to the cloud service 50 is considered.

Therefore, the multifunction peripheral 10 according to the present exemplary embodiment notifies the cloud service 50 that an alternative apparatus to the multifunction peripheral 10 is present in transmitting the scan data to the cloud service 50. In the following description, the multifunction peripheral 10 that designates another apparatus as the alternative apparatus will be referred to as a main apparatus. In addition, the multifunction peripheral 10 according to the present exemplary embodiment encrypts information necessary for downloading the text data from the cloud service 50 and transmitting the text data to the file server 20 and transmits the information to the multifunction peripheral 10 as the alternative apparatus. For example, such information may include login information to the cloud service 50, information about a document processed by the multifunction peripheral 10, and a designated storage destination. Both of the multifunction peripheral 10 according to the present exemplary embodiment and the multifunction peripheral 10 as the alternative apparatus perform polling to the cloud service 50. The alternative apparatus to the multifunction peripheral 10 may be decided in advance, or the multifunction peripheral 10 may be selected from the multifunction peripherals 10 connected to the LAN 30 each time the multifunction peripheral 10 transmits the scan data to the cloud service 50.

In the image processing system illustrated in FIG. 1, in transmitting the scan data to the cloud service 50, the multifunction peripheral 10A that is the main apparatus notifies the cloud service 50 that the multifunction peripheral 10B is the alternative apparatus. In addition, the multifunction peripheral 10A encrypts processing information necessary for downloading the text data from the cloud service 50 and transmitting the text data to the file server 20 and transmits the encrypted processing information to the multifunction peripheral 10B as the alternative apparatus.

By causing the multifunction peripheral 10 to notify the cloud service 50 of information about the alternative apparatus to the multifunction peripheral 10 and perform polling to the cloud service 50 together with the multifunction peripheral 10 as the alternative apparatus, the multifunction peripheral 10 as the alternative apparatus can acquire the text data in a case where the text data cannot be acquired from the cloud service 50 for a reason such as a malfunction of the multifunction peripheral 10.

Figure 2:
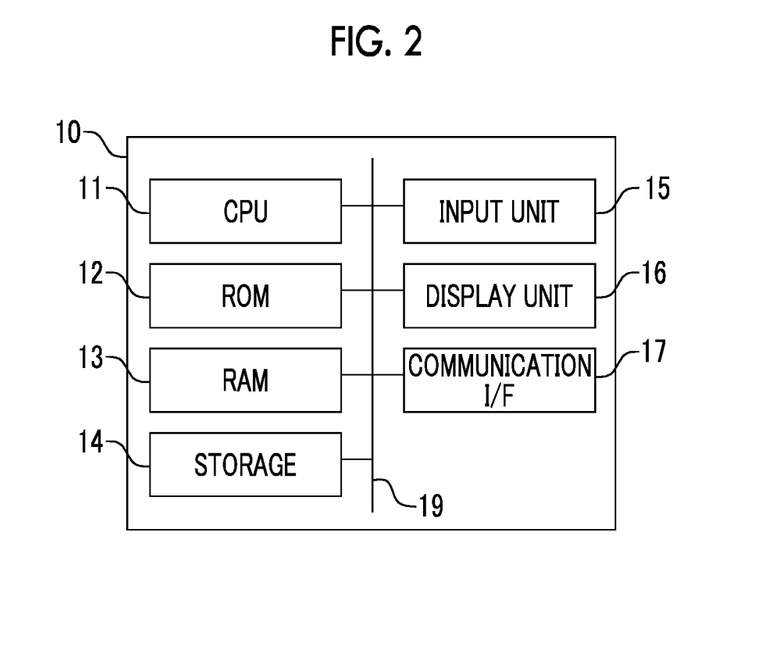
FIG. 2 is a block diagram illustrating a hardware configuration of a multifunction peripheral.

FIG. 2 is a block diagram illustrating a hardware configuration of the multifunction peripheral 10.

As illustrated in FIG. 2, the multifunction peripheral 10 includes a central processing unit (CPU) 11, a read only memory (ROM) 12, a random access memory (RAM) 13, a storage 14, an input unit 15, a display unit 16, and a communication interface (I/F) 17. These configurations are communicably connected to each other via a bus 19.

The CPU 11 is a central calculation processing unit and executes various programs or controls each unit. That is, the CPU 11 reads out a program from the ROM 12 or the storage 14 and executes the program using the RAM 13 as the work region. The CPU 11 controls each configuration and performs various calculation processes in accordance with the program recorded in the ROM 12 or the storage 14. In the present exemplary embodiment, the ROM 12 or the storage 14 stores a computer program for executing the functions of the multifunction peripheral 10.

The ROM 12 stores various programs and various data. The RAM 13 temporarily stores a program or data as the work region. The storage 14 is configured with a storage apparatus such as a hard disk drive (HDD), a solid state drive (SSD), or a flash memory and stores various programs including an operating system and various data.

The input unit 15 includes a pointing device such as a mouse and a keyboard, and is used for providing various inputs.

The display unit 16 is, for example, a liquid crystal display and displays various information. The display unit 16 may function as the input unit 15 by employing a touch panel type.

The communication interface 17 is an interface for communicating with another apparatus such as another multifunction peripheral 10, the file server 20, or the cloud service 50 and, for example, uses standards such as Ethernet (registered trademark), FDDI, and Wi-Fi (registered trademark).

In executing the computer program described above, the multifunction peripheral 10 implements various functions using hardware resources described above. Functional configurations implemented by the multifunction peripheral 10 will be described.

Next, functional configurations of the multifunction peripheral 10 will be described.

Figure 3:
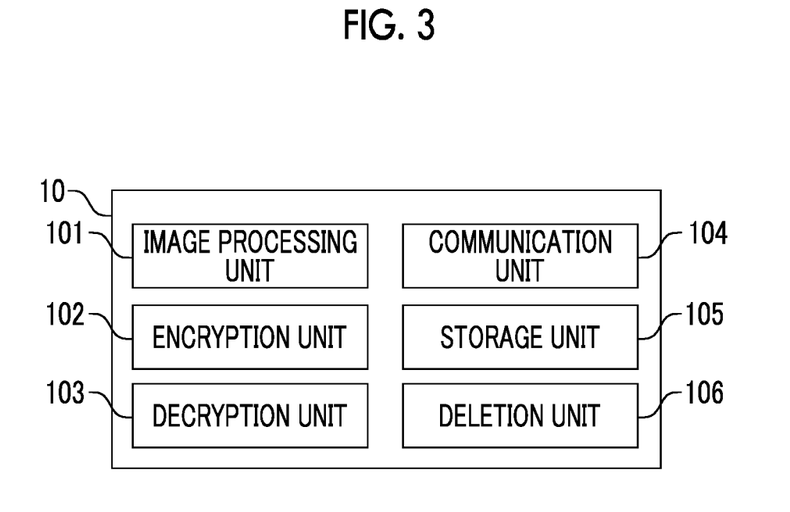
FIG. 3 is a block diagram illustrating a functional configuration example of the multifunction peripheral.

FIG. 3 is a block diagram illustrating an example of the functional configurations of the multifunction peripheral 10.

As illustrated in FIG. 3, the multifunction peripheral 10 includes an image processing unit 101, an encryption unit 102, a decryption unit 103, a communication unit 104, a storage unit 105, and a deletion unit 106 as the functional configurations. Each functional configuration is implemented by causing the CPU 11 to read out and execute the computer program stored in the ROM 12 or the storage 14.

The image processing unit 101 executes various image processing as a function of the multifunction peripheral 10. In the present exemplary embodiment, the image processing unit 101 executes image processing of generating scan data by optically scanning a document.

The encryption unit 102 encrypts the processing information for the other multifunction peripheral 10 as the alternative apparatus to the multifunction peripheral 10 to download data from the cloud service 50 and transmit the data to the file server 20 on behalf of the multifunction peripheral 10. For example, the processing information encrypted by the encryption unit 102 may include the login information to the cloud service 50, the information about the document processed by the multifunction peripheral 10, and the designated storage destination.

In a case where the multifunction peripheral 10 functions as the alternative apparatus, the decryption unit 103 decrypts the processing information for downloading the data encrypted by the main apparatus from the cloud service 50 and transmitting the data to the file server 20 on behalf of the main apparatus. A key used for the encryption by the encryption unit 102 and a key used for the decryption by the decryption unit 103 are assumed to be shared in advance between the main apparatus and the alternative apparatus.

The communication unit 104 performs a communication process with another apparatus. Specifically, the communication unit 104 performs transmission of the scan data generated by the image processing unit 101 to the cloud service 50, reception of the text data generated by the cloud service 50, transmission of the text data to the file server 20, transmission of the encrypted processing information to the multifunction peripheral 10 as the alternative apparatus, reception of the encrypted processing information from the main apparatus that designates the multifunction peripheral 10 as the alternative apparatus, and the like.

In a case where the multifunction peripheral 10 functions as the alternative apparatus, the storage unit 105 stores the processing information for downloading the data from the cloud service 50 and transmitting the data to the file server 20. The processing information stored in the storage unit 105 is the processing information decrypted by the decryption unit 103.

In a case where the multifunction peripheral 10 functions as the alternative apparatus, the deletion unit 106 deletes the processing information stored in the storage unit 105 for downloading the data from the cloud service 50 and transmitting the data to the file server 20 in a case where the multifunction peripheral 10 or the main apparatus transmits the text data to the file server 20.

By having such configurations, the alternative apparatus can receive a processing result of a service even in a case where the multifunction peripheral 10 functioning as the main apparatus cannot receive the processing result. In addition, by having such configurations, the multifunction peripheral 10 can prevent another apparatus not having permission from acquiring the processing result.

Next, an action of the image processing system will be described.

Figure 4:
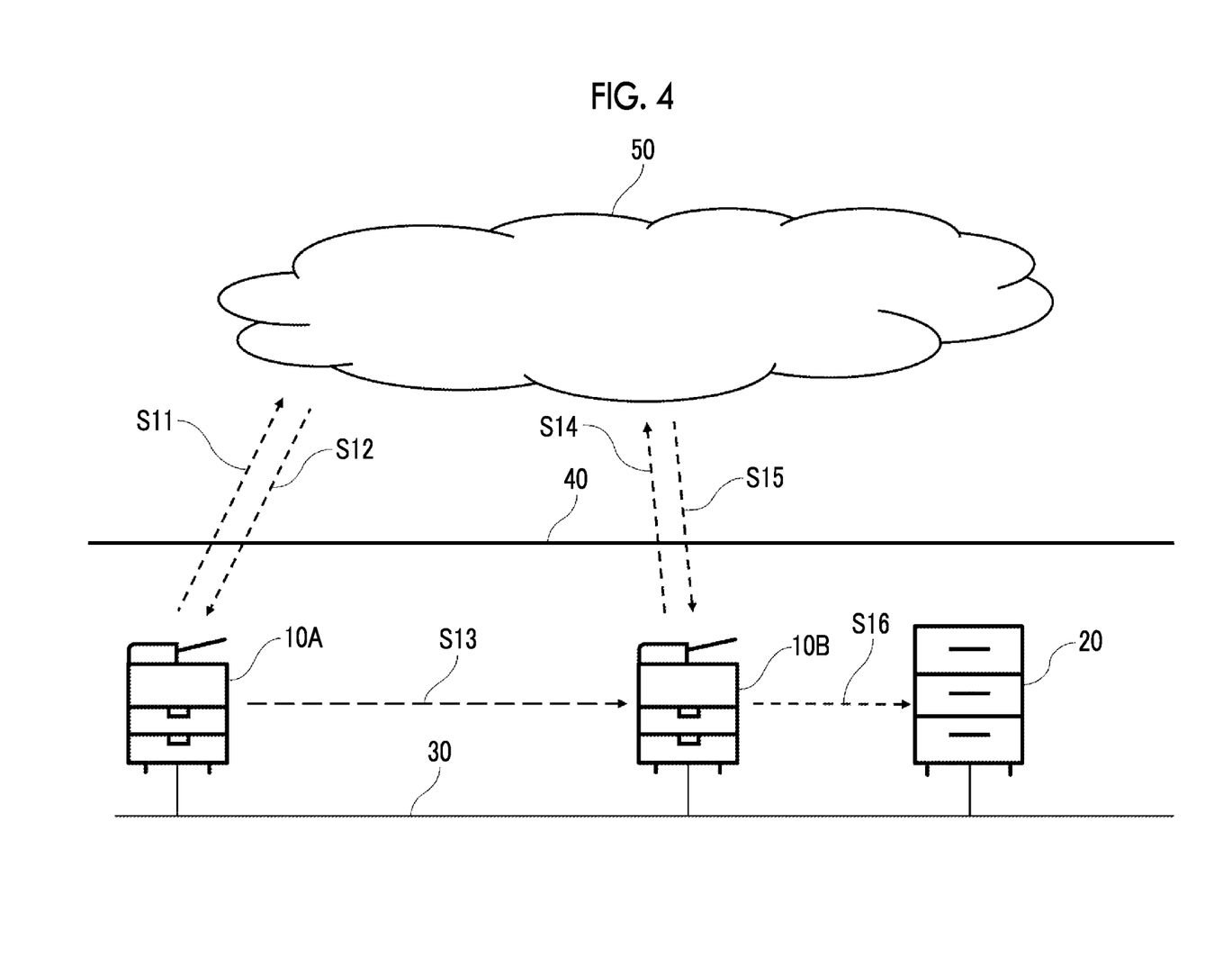
FIG. 4 is a diagram illustrating a summary of an action of the image processing system.

FIG. 4 is a diagram illustrating a summary of the action of the image processing system. In FIG. 4, the main apparatus is described as the multifunction peripheral 10A, and the alternative apparatus is described as the multifunction peripheral 10B. The example illustrated in FIG. 4 is a summary of a case where the multifunction peripheral 10A falls into an unusable state for a reason such as a malfunction after the multifunction peripheral 10A transmits the scan data to the cloud service 50.

In a case where the scan data is generated by optically scanning document data, the multifunction peripheral 10A transmits the scan data to the cloud service 50 and also transmits a notification indicating that the multifunction peripheral 10B is the alternative apparatus to the cloud service 50 in step S11.

In step S12, the cloud service 50 responds to the multifunction peripheral 10A with information for acquiring the text data created from the scan data by the cloud service 50.

In a case where the information for acquiring the text data is received from the cloud service 50, the multifunction peripheral 10A encrypts the processing information for downloading the data from the cloud service 50 and transmitting the data to the file server 20 and transmits the encrypted processing information to the multifunction peripheral 10B that is the alternative apparatus in step S13. The multifunction peripheral 10B decrypts the encrypted processing information and stores the information inside the multifunction peripheral 10B.

The multifunction peripheral 10A is assumed to fall into an unusable state for a reason such as a malfunction after the process of step S13. In step S14, the multifunction peripheral 10B inquires as to whether or not the process is completed by performing polling to the cloud service 50.

Since there is no polling from the multifunction peripheral 10A, the cloud service 50 responds to the polling from the multifunction peripheral 10B designated as the alternative apparatus by the multifunction peripheral 10A in step S15. In a case where the response from the cloud service 50 is received, the multifunction peripheral 10B downloads the text data generated by the cloud service 50 from the cloud service 50.

In a case where the text data generated by the cloud service 50 is downloaded from the cloud service 50, the multifunction peripheral 10B transmits the downloaded text data to the file server 20 in step S16 based on the information transmitted from the multifunction peripheral 10A in step S13.

Figure 5:
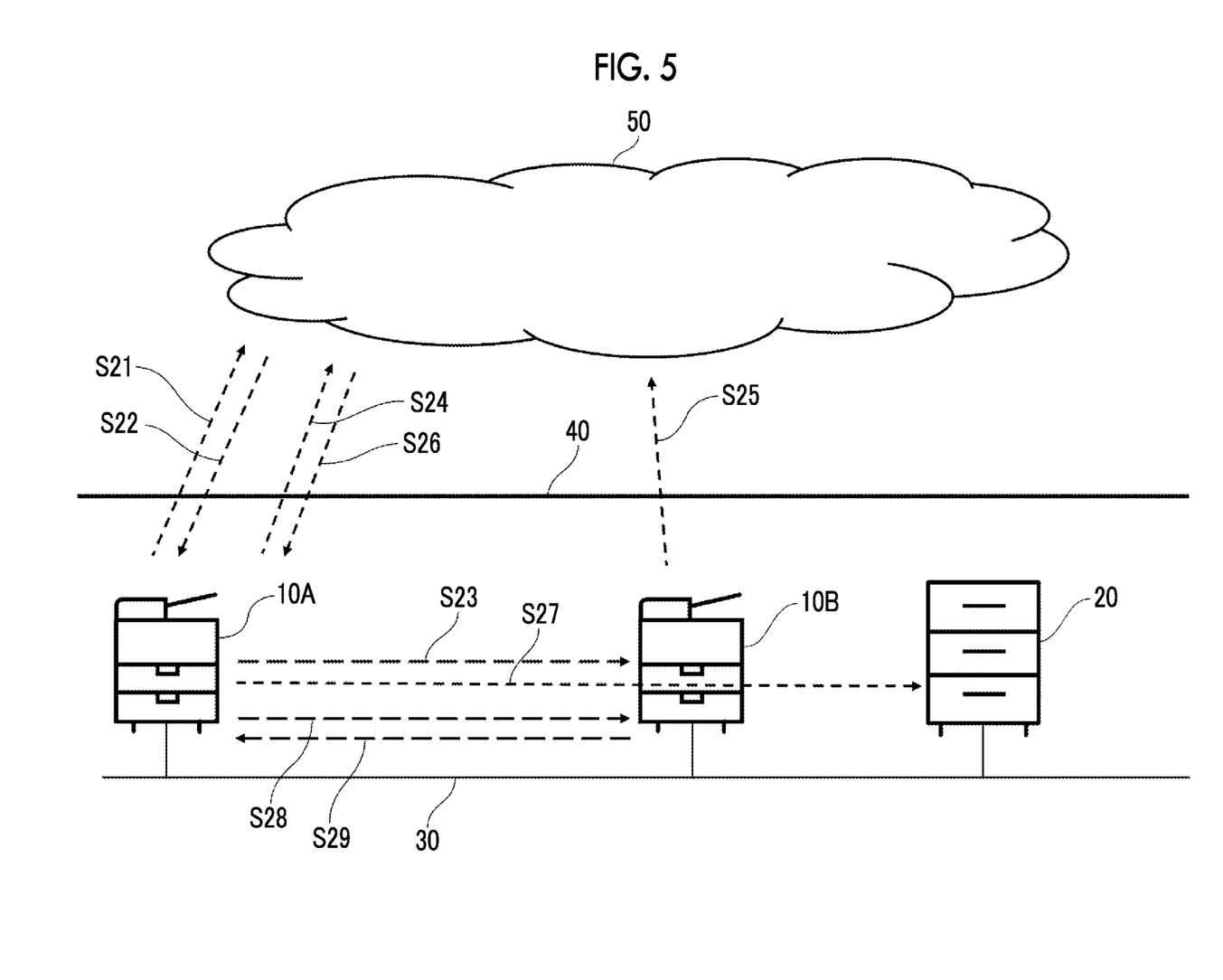
FIG. 5 is a diagram illustrating a summary of the action of the image processing system.

FIG. 5 is a diagram illustrating a summary of the action of the image processing system. In FIG. 5, the main apparatus is described as the multifunction peripheral 10A, and the alternative apparatus is described as the multifunction peripheral 10B. The example illustrated in FIG. 5 is a summary of a case where the multifunction peripheral 10A is in a usable state after the multifunction peripheral 10A transmits the scan data to the cloud service 50.

In a case where the scan data is generated by optically scanning document data, the multifunction peripheral 10A transmits the scan data to the cloud service 50 and also transmits the notification indicating that the multifunction peripheral 10B is the alternative apparatus to the cloud service 50 in step S21.

In step S22, the cloud service 50 responds to the multifunction peripheral 10A with the information for acquiring the text data created from the scan data by the cloud service 50.

In a case where the information for acquiring the text data is received from the cloud service 50, the multifunction peripheral 10A encrypts the processing information for downloading the data from the cloud service 50 and transmitting the data to the file server 20 and transmits the encrypted processing information to the multifunction peripheral 10B that is the alternative apparatus in step S23. The multifunction peripheral 10B decrypts the encrypted processing information and stores the information inside the multifunction peripheral 10B.

Next, in step S24, the multifunction peripheral 10A inquires as to whether or not the process is completed by performing polling to the cloud service 50. In step S25, the multifunction peripheral 10B that is the alternative apparatus also inquires as to whether or not the process is completed by performing polling to the cloud service 50.

Since there is polling from the multifunction peripheral 10A, the cloud service 50 responds to the polling from the multifunction peripheral 10A in step S26. In a case where the response from the cloud service 50 is received, the multifunction peripheral 10A downloads the text data generated by the cloud service 50 from the cloud service 50.

In a case where the text data generated by the cloud service 50 is downloaded from the cloud service 50, the multifunction peripheral 10A transmits the downloaded text data to the file server 20 in step S27.

Next, since the information transmitted to the multifunction peripheral 10B in step S23 is no longer necessary, the multifunction peripheral 10A requests the multifunction peripheral 10B to delete the information in step S28. The multifunction peripheral 10B receives the request, deletes the information transmitted from the multifunction peripheral 10A and responds to the multifunction peripheral 10A to notify that the deletion of the information is completed in step S29. In a case where there is no response from the multifunction peripheral 10B with respect to the request to delete the processing information, the multifunction peripheral 10A may output a notification for checking whether or not the processing information is deleted to the multifunction peripheral 10B. By outputting the notification for checking whether or not the processing information is deleted to the multifunction peripheral 10B, the multifunction peripheral 10A can cause the multifunction peripheral 10B to check whether or not unnecessary processing information is maintained.

By executing the operation illustrated in FIG. 4 and FIG. 5, the multifunction peripheral 10B can receive the processing result of the cloud service 50 even in a case where the multifunction peripheral 10A cannot receive the processing result. In addition, by executing the operation illustrated in FIG. 4 and FIG. 5, the multifunction peripheral 10A can prevent another apparatus not having permission from acquiring the processing result of the cloud service 50 even in a case where the processing result cannot be received.

Figure 6:
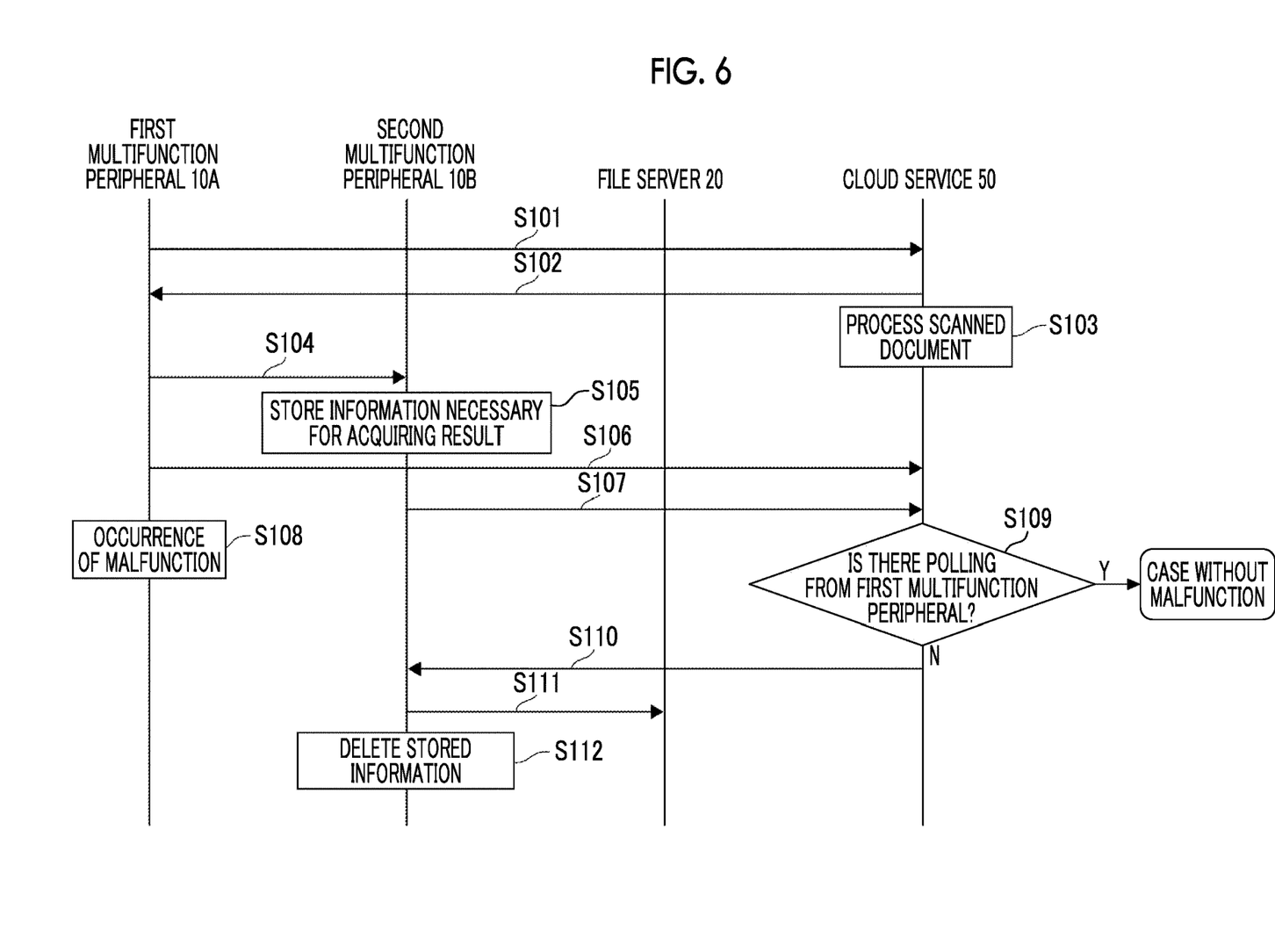
FIG. 6 is a sequence diagram illustrating a flow of image processing.

FIG. 6 is a sequence diagram illustrating a flow of image processing performed by the multifunction peripherals 10A and 10B, the file server 20, and the cloud service 50 of the image processing system. The image processing based on the sequence diagram illustrated in FIG. 6 is performed by causing the CPU 11 to read out the computer program from the ROM 12 or the storage 14, load the computer program into the RAM 13, and execute the computer program in the multifunction peripherals 10A and 10B. The sequence diagram illustrated in FIG. 6 is an example of the process in a case where the multifunction peripheral 10A falls into an unusable state for a reason such as a malfunction after the multifunction peripheral 10A transmits the scan data to the cloud service 50.

In a case where the scan data is generated by optically scanning the document data, the multifunction peripheral 10A transmits the scan data to the cloud service 50 and also transmits the notification indicating that the multifunction peripheral 10B is the alternative apparatus to the cloud service 50 in step S101.

In step S102, the cloud service 50 responds to the multifunction peripheral 10A with the information for acquiring the text data created from the scan data by the cloud service 50. In addition, in step S103, the cloud service 50 executes a process of creating the text data from the scanned document.

In a case where the information for acquiring the text data is received from the cloud service 50, the multifunction peripheral 10A encrypts the processing information for downloading the data from the cloud service 50 and transmitting the data to the file server 20 and transmits the encrypted processing information to the multifunction peripheral 10B that is the alternative apparatus in step S104. In step S105, the multifunction peripheral 10B decrypts the encrypted processing information and stores the processing information inside the multifunction peripheral 10B.

Next, in step S106, the multifunction peripheral 10A inquires as to whether or not the process is completed by performing polling to the cloud service 50. In step S107, the multifunction peripheral 10B that is the alternative apparatus also inquires as to whether or not the process is completed by performing polling to the cloud service 50.

The multifunction peripheral 10A is assumed to fall into an unusable state for a reason such as a malfunction after the process of step S106 (step S108). In step S109, the cloud service 50 determines whether or not there is polling from the multifunction peripheral 10A. In this case, since there is no polling from the multifunction peripheral 10A (step S109: No), the cloud service 50 responds to the polling from the multifunction peripheral 10B designated as the alternative apparatus by the multifunction peripheral 10A in step S110. In a case where the response from the cloud service 50 is received, the multifunction peripheral 10B downloads the text data generated by the cloud service 50 from the cloud service 50.

In a case where the text data generated by the cloud service 50 is downloaded from the cloud service 50, the multifunction peripheral 10B transmits the downloaded text data to the file server 20 in step S111 based on the information transmitted from the multifunction peripheral 10A in step S104.

In a case where the text data is transmitted to the file server 20, the multifunction peripheral 10B deletes the information transmitted from the multifunction peripheral 10A in step S112.

Figure 7:
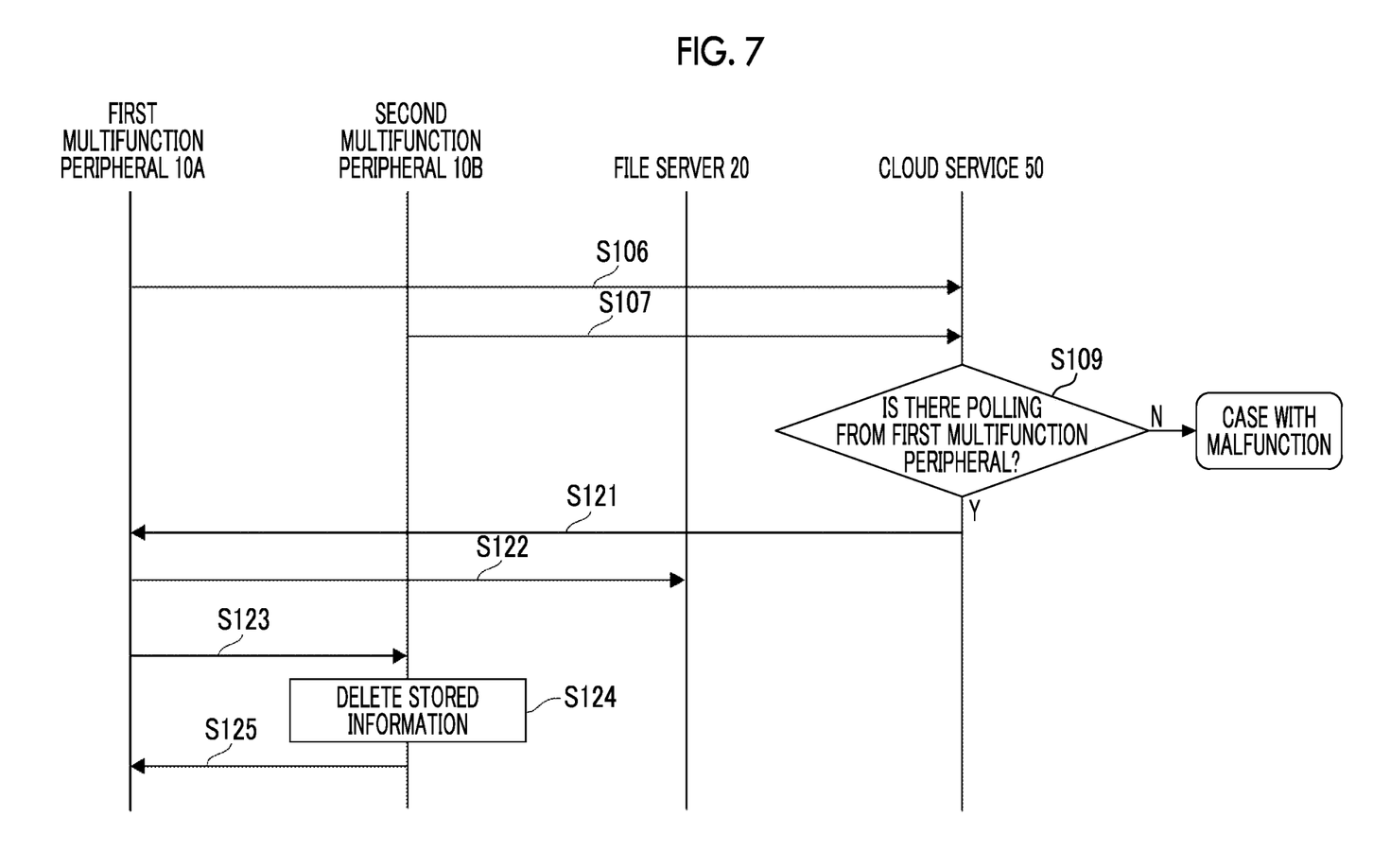
FIG. 7 is a sequence diagram illustrating a flow of image processing.

FIG. 7 is a sequence diagram illustrating a flow of image processing performed by the multifunction peripherals 10A and 10B, the file server 20, and the cloud service 50 of the image processing system. The image processing based on the sequence diagram illustrated in FIG. 7 is performed by causing the CPU 11 to read out the computer program from the ROM 12 or the storage 14, load the computer program into the RAM 13, and execute the computer program in the multifunction peripherals 10A and 10B. The sequence diagram illustrated in FIG. 7 is an example of the process in a case where the multifunction peripheral 10A is in a usable state after the multifunction peripheral 10A transmits the scan data to the cloud service 50. In addition, in FIG. 7, the process before step S106 in FIG. 6 is omitted.

In step S109, the cloud service 50 determines whether or not there is polling from the multifunction peripheral 10A. In this case, since there is polling from the multifunction peripheral 10A (step S109: Yes), the cloud service 50 responds to the polling from the multifunction peripheral 10A in step S121. In a case where the response from the cloud service 50 is received, the multifunction peripheral 10A downloads the text data generated by the cloud service 50 from the cloud service 50.

In a case where the text data generated by the cloud service 50 is downloaded from the cloud service 50, the multifunction peripheral 10A transmits the downloaded text data to the file server 20 in step S122.

Next, since the information transmitted to the multifunction peripheral 10B in step S104 in FIG. 6 is no longer necessary, the multifunction peripheral 10A requests the multifunction peripheral 10B to delete the information in step S123. In step S124, the multifunction peripheral 10B receives the request, deletes the information transmitted from the multifunction peripheral 10A and responds to the multifunction peripheral 10A to notify that the deletion of the information is completed in step S125. In a case where there is no response from the multifunction peripheral 10B with respect to the request to delete the processing information, the multifunction peripheral 10A may output a notification for checking whether or not the processing information is deleted to the multifunction peripheral 10B. By outputting the notification for checking whether or not the processing information is deleted to the multifunction peripheral 10B, the multifunction peripheral 10A can cause the multifunction peripheral 10B to check whether or not unnecessary processing information is maintained.

By executing the operation illustrated in FIG. 6 and FIG. 7, the multifunction peripheral 10B can receive the processing result of the cloud service 50 even in a case where the multifunction peripheral 10A cannot receive the processing result. In addition, by executing the operation illustrated in FIG. 6 and FIG. 7, the multifunction peripheral 10A can prevent another apparatus not having permission from acquiring the processing result of the cloud service 50 even in a case where the processing result cannot be received.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed. In addition, a hardware structure of these various processors is specifically an electric circuit in which circuit elements such as semiconductor elements are combined.

While an aspect in which the computer program is pre-stored (installed) in the ROM or the storage is described in each exemplary embodiment, the present invention is not limited to the aspect. The program may be provided in the form of a recording on a non-temporary (non-transitory) recording medium such as a compact disk read only memory (CD-ROM), a digital versatile disk read only memory (DVD-ROM), and a universal serial bus (USB) memory. In addition, the program may be in the form of a download from an outside apparatus via a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus system comprising:
   a first image forming apparatus; and
   a second image forming apparatus,
   wherein the first image forming apparatus includes a first processor configured to:
   transmit data obtained by optically scanning a target object to a service for executing a predetermined process on the data;
   encrypt processing information for acquiring a result of the predetermined process of the service and executing a process for the result of the predetermined process; and
   transmit the encrypted processing information to the second image forming apparatus, and
   the second image forming apparatus includes a second processor configured to:
   in a case where the first image forming apparatus falls into a state where the result of the predetermined process of the service is not acquired, acquire the result of the predetermined process of the service and execute the process for the result of the process using the encrypted processing information acquired from the first processor.

2. The image forming system according to claim 1, wherein the processor is configured to:
   in a case where the image forming apparatus acquires the result of the predetermined process of the service, request the other image forming apparatus to delete the processing information.

3. The image forming system according to claim 2, wherein the processor is configured to:
   in a case where there is no response from the other image forming apparatus with respect to the request to delete the processing information, output a notification for checking whether or not the processing information is deleted.

4. The image forming system according to claim 1, wherein the processor is configured to:
   store the result in a server as the process for the result.

5. The image forming system according to claim 4,
   wherein the image forming apparatus and the server are installed in an identical network segment.

6. The image forming system according to claim 1,
   wherein the image forming apparatus and the other image forming apparatus are installed in an identical network segment.

7. The image forming system according to claim 1,
   wherein the image forming apparatus is connected to the service via a firewall.

8. A non-transitory computer readable medium storing a computer program causing a computer to execute a process comprising:
   transmitting data obtained by optically scanning a target object to a service for executing a predetermined process on the data;
   encrypting processing information for acquiring a result of the predetermined process of the service and executing a process for the result of the predetermined process; and
   transmitting the encrypted processing information to another image forming apparatus such that, in a case where the computer falls into a state where the result of the predetermined process of the service is not acquired, the another image forming apparatus acquires the result of the predetermined process of the service and executes the process for the result of the process using the encrypted processing information acquired from the computer.

\* \* \* \* \*